United States Patent [19]

Pecaut

[11] Patent Number: 5,020,134
[45] Date of Patent: May 28, 1991

[54] CATV SIGNAL DISTRIBUTION SYSTEM AND LOCAL STATUS MONITOR THEREFOR

[76] Inventor: Steven C. Pecaut, 22721 Bella Rita Cir., Boca Raton, Fla. 33433

[21] Appl. No.: 354,205

[22] Filed: May 19, 1989

[51] Int. Cl.$^5$ .......................................... H04B 12/00
[52] U.S. Cl. ...................................... 455/67; 455/115; 330/2
[58] Field of Search .................. 455/3, 4, 5, 6, 67, 455/9, 115, 117, 127; 358/86; 379/4; 330/2

[56] References Cited

U.S. PATENT DOCUMENTS

| | | | |
|---|---|---|---|
| 3,617,657 | 11/1971 | Brewer | 379/4 |
| 3,768,028 | 10/1973 | Wolcott et al. | 330/2 |
| 3,806,813 | 4/1974 | Eller | 455/6 |
| 3,895,191 | 7/1975 | Koganezawa et al. | 455/67 |
| 4,019,150 | 4/1977 | Lurey et al. | 330/2 |
| 4,077,006 | 2/1978 | Nicholson | 455/3 |
| 4,135,157 | 1/1979 | den Toonder | 455/6 |
| 4,344,028 | 8/1982 | Bank et al. | 330/2 |
| 4,413,229 | 11/1983 | Grant | 455/67 |
| 4,491,968 | 1/1985 | Shimp et al. | 455/67 |
| 4,521,912 | 6/1985 | Franke et al. | 455/115 |
| 4,524,446 | 6/1985 | Sun et al. | 455/67 |
| 4,563,775 | 1/1986 | Yokosuka | 455/117 |
| 4,593,409 | 6/1986 | Miller | 455/117 |
| 4,733,223 | 3/1988 | Gilbert | 455/3 |
| 4,797,627 | 1/1989 | Chism et al. | 330/2 |

*Primary Examiner*—Reinhold J. Eisenzopf
*Assistant Examiner*—Lisa Charouel
*Attorney, Agent, or Firm*—Malin, Haley, McHale DiMaggio & Crosby

[57] ABSTRACT

A novel CATV signal distribution system includes a head end, a plurality of taps, lines including a coaxial line connecting the head end with the taps, and at least one signal amplifier in the coaxial line, the amplifier for producing output signals within a prescribed range of operating parameters. The novel system includes a local status monitor operatively connected to and in close proximity with one or more of the amplifiers in the system. Each status monitor is adjusted to produce a status signal that is visually, aurally or otherwise detectable by service personnel in the vicinity of the amplifier when the amplifier malfunctions. A novel local status monitor circuit for use in the novel system is also disclosed.

4 Claims, 3 Drawing Sheets

CATV SIGNAL DISTRIBUTION SYSTEM AND LOCAL STATUS MONITOR THEREFOR

BACKGROUND OF THE INVENTION

1. Field of the Invention

This invention relates to a novel CATV signal distribution system having coaxial lines and signal amplifiers therein. The invention particularly relates to local means for indicating when the output of one or more of the amplifiers is outside its prescribed operating range.

2. Description of the Prior Art

A CATV signal distribution system collects television and other electronic communications signals from one or more of various sources, such as large antennas for off-the-air transmissions, by a satellite receiving station, or directly from locally generating sources by telephone line, cable, microwave, etc. These raw signals are collected at a head end where they are processed to put them in a form for distribution to subscribers. Once processed, the signals are combined and routed to the subscribers through trunk and feeder paths of the system.

Each subscriber connects to a tap in a local feeder line which provides signals in a multiplicity of channels, which are generally six (6) MHz in bandwidth. A 300 MHz system has a capability of about thirty-five (35) channels. Also, many CATV signal distribution systems can also transport signals "upstream"; that is, from the subscriber to the head end or to an intermediate point in the system. There are many other variations on the basic form of the system described above. More detailed information on CATV signal distribution systems may be found in *Cable Communication* by T. F. Baldwin et al. (Prentice-Hall, Inc., Englewood Cliffs, N.J. 1983) and *Cable Television* by W. Grant (Reston Publishing Co., Inc., Reston, Va. 1983).

In a typical CATV signal distribution system, the combined signals at the head end are fed into a trunk line where they pass over some distance to a splitter, which divides the combined signals and passes them to two (2) or more trunks. The signals then pass in each trunk line to feeder lines, each of which is provided with a plurality of taps. The trunk and feeder lines are usually coaxial cables which are strung on poles or are underground in conduits.

As the combined signals travel downstream in the coaxial cables to the subscribers, loss is incurred and the power level becomes progressively lower, and may fall below prescribed operating parameters required for acceptable subscriber use. Low signal amplitude may result in a snowy picture on the subscribers' television set.

To remedy this problem, the CATV system includes wide-band amplifiers at each junction with the trunk and feeder lines and, optionally, at intermediate points in the lines. Such amplifiers compensate for the drop in power level due to losses in the system and due to the splitting of the signals. Each amplifier is adjusted to provide an output within a prescribed range of operating parameters. If the amplifier is out of adjustment, the output may be too strong, in which case the subscriber may see wide jumpy bands in the picture on his/her television set. Too weak an output signal may result in a snowy picture, as mentioned above.

When the subscriber telephones the system operator and complains about the quality of the signals at his/her tap, a service person must go to each amplifier that is suspect of malfunctioning, or of being out of adjustment, and test the output at the test jack in each amplifier. This is a time consuming and strenuous job, since it requires climbing poles for polehung coaxial lines and descending underground for coaxial lines in conduits in order to access each amplifier.

Some prior systems provide status monitoring electronically where there is the capability of passing test signals upstream in the system. Through sequential polling of each amplifier in the system, data for each amplifier can be displayed to identify present and/or potential amplifier problems. While this monitoring process may reduce fault-finding time and cost by remotely identifying problem areas, a service person must, nevertheless, go to and test each suspect amplifier. Such prior systems require the amplifier location and the malfunction to be coded. Such coding required additional signal processing equipment at the amplifiers and at the head end, thereby adding substantial additional cost and maintenance to the system.

OBJECTS OF THE INVENTION

An object of this invention is to provide a novel CATV signal distribution system having local means for monitoring a malfunctioning amplifier therein.

Another object is to provide a novel CATV system of the type just described which does not require upstream signal movement capability.

A further object is to provide a novel CATV system of the type just described by which a service person can detect the malfunctioning amplifier from within the local area in which the amplifier is located.

Still another object is to provide a novel local status monitor circuit for use in the novel CATV system of the type just described.

Yet another object is to provide a novel local status monitor circuit of the type just described having the capability of emitting a local signal, which is indicative of a malfunctioning amplifier to which it is connected, and which is visually or aurally detectable by a service person in the local area in which the amplifier is located.

A further object is to provide a system of the type described and an amplifier monitor circuit for the system which does not involve codes or coding and can alert a service person in its vicinity to the malfunction of the amplifier to which it is connected.

Another object is to monitor a system designed for transmission of radio frequency signals both upstream and downstream to monitor amplifiers therein, and to produce a local visual alarm so as to notify field personnel of an amplifier malfunction at a specific location.

SUMMARY OF THE INVENTION

The novel CATV signal distribution system includes, as in prior systems, a head end, a plurality of taps, means connecting the head end with the taps including a coaxial line, and at least one signal amplifier in the coaxial line; the amplifier for producing output signals within a prescribed range of operating parameters. Unlike prior systems, the novel system includes a local status monitor operatively connected to and in close proximity with one or more of the amplifiers in the system. Each status monitor is adjusted to produce a status signal when the amplifier output signals are outside the prescribed operating range. The status signal is detectable by a service person in the local area where the amplifier is located, and the status signal may be detectable visually, aurally, or otherwise.

Since the status signal is readily identified with the malfunctioning amplifier by service personnel in the immediate vicinity of the amplifier, coding of information is not required and the system does not need the capabilities of upstream signal transmission, information coding, and the handling of coded information. Besides, the service person can identify each malfunctioning amplifier from ground level, even from his/her service vehicle, without climbing a pole or descending to a conduit to test the amplifier.

The invention includes a novel local status monitor circuit for use in the above-described CATV signal distribution system where the amplifier station includes an output test jack and a source of electric power for the amplifier. The novel monitor circuit includes a signal-processing-and-comparator means, a connecting lead for connecting the signal processing-and-comparator means with the amplifier test jack, the signal processing-and-comparator means for producing a DC signal that is indicative of whether the amplifier output signals are outside the prescribed range of operating parameters. The novel circuit includes a means for generating a status signal, a switch operable by the DC signal operatively connected to the status-signal-generating means, and a power-input connecting means for connecting the switch and the status-signal-generating means with the amplifier power source.

In a preferred embodiment, the novel circuit includes a high bandpass branch for processing a higher frequency portion of the amplifier output signal and producing a high-pass DC signal, a low bandpass branch for processing a lower frequency portion of the amplifier output signal and producing a low-pass DC signal, and means for applying both high-pass and low-pass DC signals in the alternative. The amplifier usually amplifies a very wide band of frequencies, and deterioration or attenuation of different portions of the amplified signal may differ significantly. By employing both high and low bandpass branches as described, the novel circuit can monitor the performance of the amplifier reliably.

Where two (2) amplifiers are physically located in the same box, the novel circuit may include high bandpass and low bandpass branches for each amplifier, and the DC outputs for the four (4) branches may be connected to a single switch and status-signal-generating means in order to reduce the number of components and cost.

DETAILED DESCRIPTION OF THE INVENTION INCLUDING THE PREFERRED EMBODIMENTS

Figure 1:
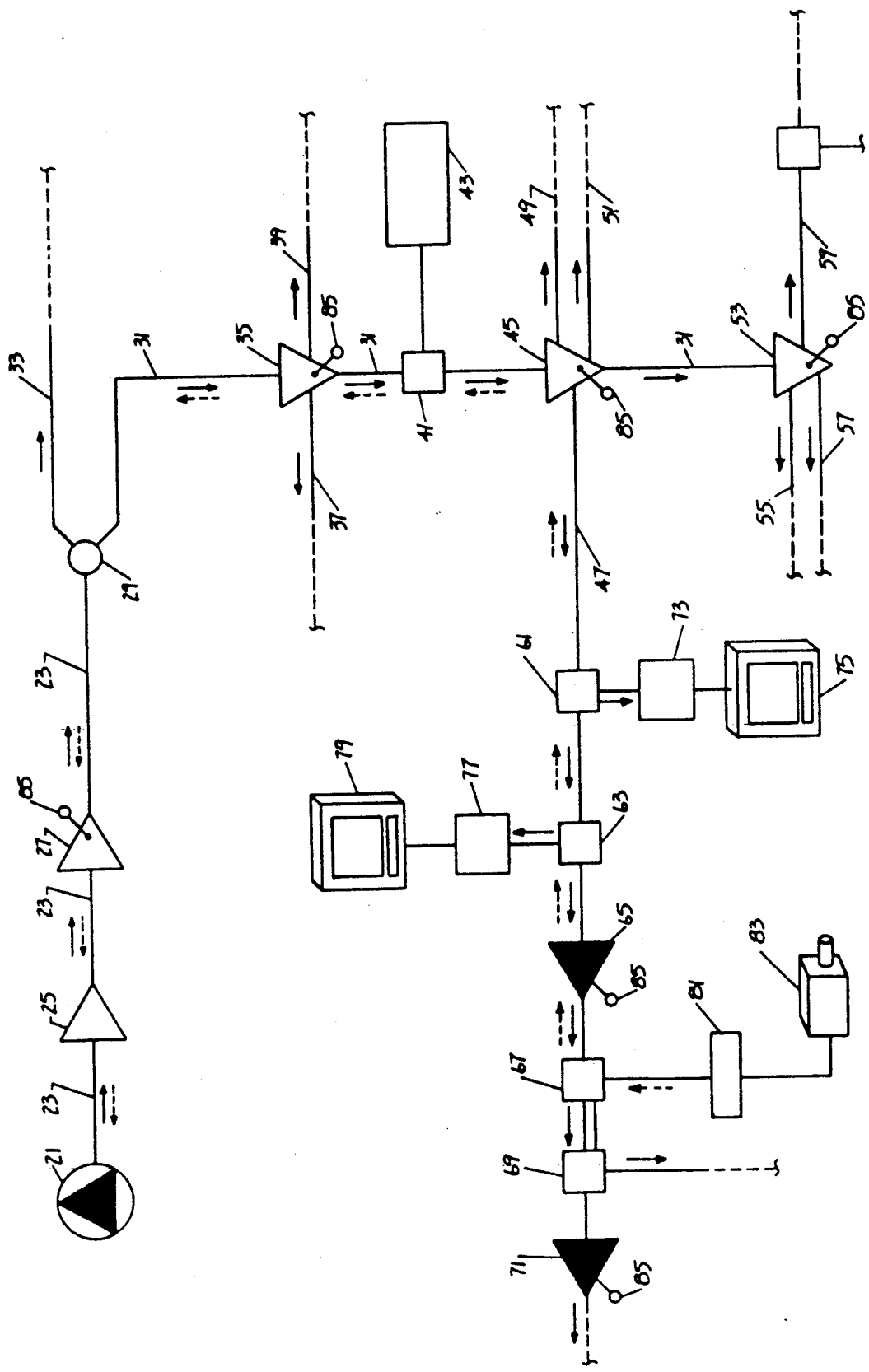
FIG. 1 is a schematic diagram of a novel CATV signal distribution system embodying the novel monitors.

The following description of some of the preferred embodiments of the concepts of this invention is made in reference to the accompanying figures. Where an individual structural element is depicted in more than one figure, it is assigned a common reference numeral for simplification of identification and understanding.

FIG. 1 is a schematic diagram of a CATV signal distribution system provided by Scientific Atlanta Corporation, Atlanta, Ga. and modified according to the invention. It will be understood that systems provided by other vendors can be modified in a similar manner also.

The system shown in FIG. 1 includes a head end (21) where signals from various sources, such as transmissions from satellites, from microwave sources, from over-the-air, from telephone lines, etc., are gathered and processed to produce forward signals in a multiplicity of channels. In addition, the system is capable of passing reverse signals back to the head end (21). In this example, the system is sometimes called a single-cable, 550 MHz, two-way system.

Forward signals in the 50 to 550 MHz frequency range are carried down the main trunk coaxial cable (23) to the first two-way trunk station (25), where the signals are equalized and amplified to correct for the inherent frequency characteristics of coaxial cable. The forward signals then pass in the main trunk to a second two-way trunk station (27) providing amplification and automatic gain control at both the high and low frequency ends of the system bandpass. The output signals from the second trunk station (27) are within a prescribed range of operating parameters. Each subsequent amplifier in the system will produce output signals that are within this range of operating parameters.

The forward signals then pass in the main trunk cable (23) to a two-way splitter (29) which divides the forward signal power level into two (2) parts, each part having the full frequency range and passes, and passes then down a first branch trunk (31) and a second branch trunk (33). Only the first branch trunk (31) will be described since the second branch trunk (33) is a variation of the first branch trunk (31).

The forward signals then pass in the branch trunk cable (31) to a first intermediate bridging station (35) where the signal power level is divided. Two (2) parts are amplified to the above mentioned range of operating parameters and each of these signals is forwarded down one to one of the feeder lines (37 and 39). One amplified part is forwarded down the first branch trunk (31) to a power inserter station (41) where power from a power supply (43) is inserted into the cable (31).

The forward signals pass from the power inserter station (41) to an automatic trunk amplifier station (45) where the signals are divided into two (2) parts, one part being amplified to an output within the above mentioned range of operating parameters and forwarded down the trunk (31) while the other part is amplified to the above mentioned operating parameters and fed to a plurality of feeder lines (47, 49 and 51).

The forward signals forwarded down the branch trunk (31) pass to a terminating bridging station (53) where the signals are amplified to the above mentioned range of operating parameters and then fed to a plurality of feeder lines (55, 57 and 59).

Each feeder line (37, 39, 47, 49, 51, 55, 57 and 59) serves a local area and will have one or more taps for each subscriber. Each feeder line will have faculties and services according to the needs of the subscribers on that feeder line. Only the one feeder line (47) will be described as exemplary of a feeder line.

The forward signals in the one feeder line (47) pass in the line to a first tap (61), a second tap (63), a first line extender amplifier (65), a third tap (67), a fourth tap (69), a second line extender amplifier (71) and so forth until its termination. At the first tap (61), a portion of the forward signal power passes to a first set-top termination (73) and then to the subscribers TV set (75). At the second tap (63), a portion of the forward signal power passes to a second set-top termination (77) and then to the subscriber's TV set (79). The third tap (67) does not draw any forward signal power, but instead feeds a reverse signal into the tap through a modulator (81) from the subscribers video camera (83).

In the system shown in FIG. 1, the coaxial cables for the main trunk (23), the branch trunks (31 and 33) and the feeder lines, including feeder line (47), are carried aerially on poles. Optionally, all or a portion of any of these lines may be in conduits underground. All of the stations are contained in weatherproof housings attached directly into the lines which also physically support the stations.

Figure 2:
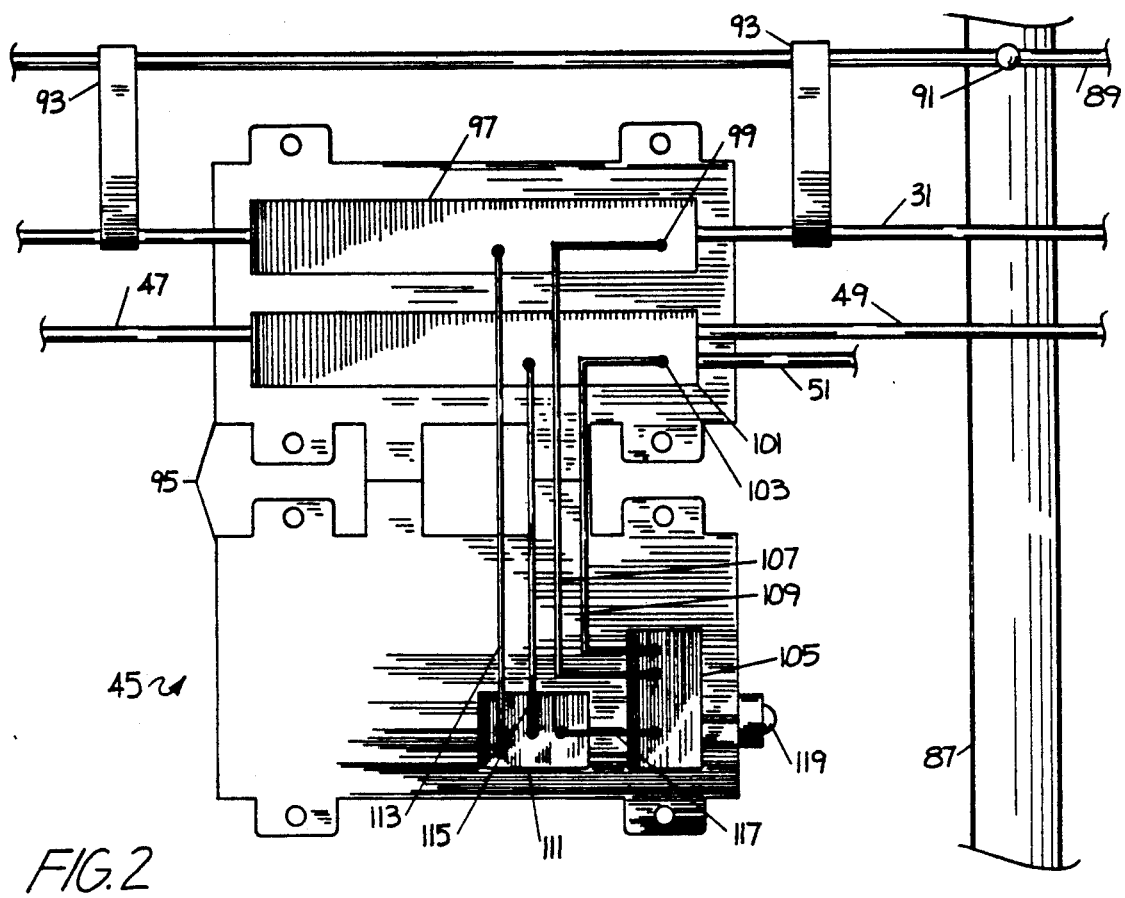
FIG. 2 is an elevational view of a pole-hung bridging amplifier, power supply and novel monitor with its hinged housing in its open position.

Each of the amplifiers in the various stations includes a status monitor in the amplifier housing including a means (85) for generating a local status signal which is detectable by a service person in the vicinity of that amplifier and which indicates when the output signal of that amplifier outside its prescribed range of operation. Thus, the service can drive down the street and observe each pole-mounted housing from his/her vehicle and determine visually, aurally or otherwise, which particular amplifier is malfunctioning.

Where the station contains two (2) amplifiers, as is the case at the automatic trunk amplifier station (45), the physical arrangement may be as shown in the elevational view shown in FIG. 2. A pole (87) supports a steal support cable (89) on supports (91). The amplifier station (45) is supported on the branch trunk cable (31) from hangars (93) on the support cable (89). The station (45) includes a hinged weatherproof housing (95) (shown in the open position) which houses all of the electronic equipment of the station. As shown in FIG. 2, the station equipment includes a trunk repeater amplifier (97) having a test jack (99) connected in the branch trunk (31), a bridging amplifier (101) having a test jack (103) to the trunk repeater amplifier (97), a status monitor (105) connected by the leads (107 and 109) to the test jacks (99 and 103, respectively) and a regulated power supply (111) supplying power to each of the repeater amplifier (97), the bridging amplifier (101) and the status monitor (105) through the leads (113, 115 and 117, respectively). The status monitor (105) includes a signal light (119) mounted on the outside of the housing (95).

Figure 3:
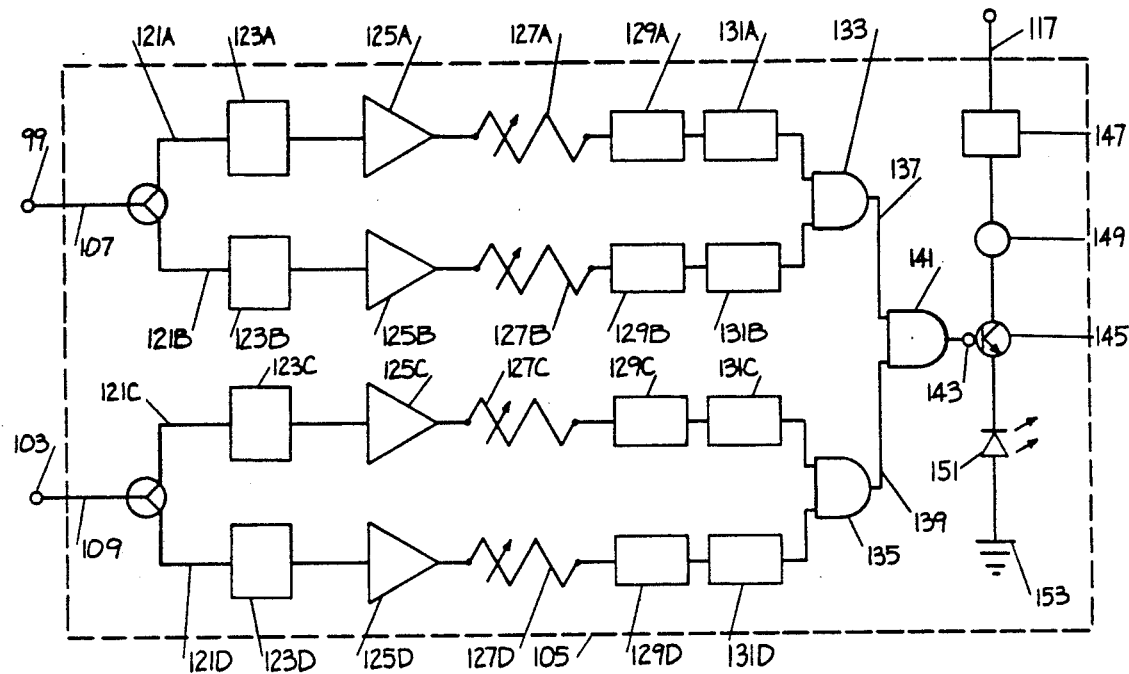
FIG. 3 is a schematic circuit diagram of the novel monitor shown in FIG. 2.

The schematic circuit for the status monitor of FIG. 2 is shown in FIG. 3. The input signal along the lead (107) is passed through a first high pass leg (121A) where it passes in series through a high bandpass filter (123A), an amplifier (125A), an adjustable attenuator (127A), an AC-to-DC converter (129A), a comparator (131A) whose DC output is fed to a first AND-gate (133); and through a second low pass leg (121B), an amplifier (125B), an adjustable attenuator (127B), an AC-to-DC converter (129B), a comparator (131B) whose DC output is fed to the first AND-gate (133). The input signal along the lead (109) is passed through similar third high pass and fourth low pass legs (121C and 121D) having similar components in series bearing the same reference numerals followed by a "C" and a "D", respectively, both of which are fed to a second AND-gate (135). The outputs from the first and second AND-gates (133 and 135) are fed to a third AND-gate (141) through the first and second gate leads (137 and 139, respectively). The output signal, which is the largest of the signals from anyone of the legs (121A, 121B, 121C and 121D), is fed to the control terminal (143) of an electronic switch (145). The switch (145) is supplied on one side with power from the power supply (111) through the lead (117) and includes a charger unit (147) and a 3-volt battery (149) in series with the switch (145). A light-emitting diode cluster or other light source (151) is connected on the other side of the switch (145) and to a ground (153).

Figure 4:
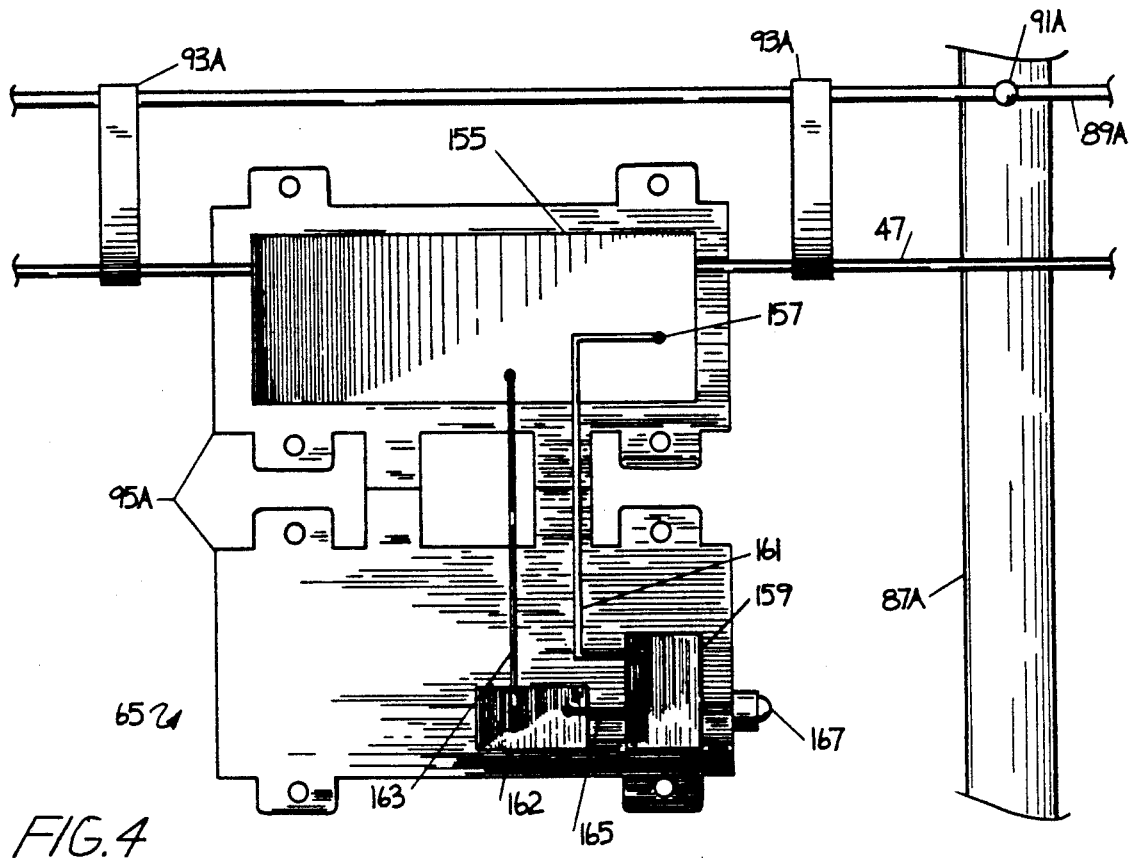
FIG. 4 is an elevational view of a pole-hung line-extender amplifier, power supply and novel monitor with its hinged housing in its open position.

The prescribed operating parameter of interest is the amplitude of the signals since the high and the low frequencies in the CATV signal may be attenuated differently, both a high and a low frequency position is sampled, and if either one is outside it prescribed range, the switch (145) will turn on the light source (151) without manual intervention. In a typical CATV signal distribution system, the prescribed signal amplitude range is about 28 to 47 dbmv (decibels of millivolts across a 75 OHM impedance). Where the signal is attenuated by more than 5 db, the switch (145) will be on. Where the signal amplitude of the amplifier output is at least 5 dbmv above the prescribed operating range, the switch (145) will be on.

Where the station contains one amplifier, as is the case at the two-way trunk station (27), the first extender amplifier (65) and the second extender amplifier (71), the physical arrangement may be as shown in the elevation view shown in FIG. 4, which is similar in structure to that shown in FIG. 2 and similar structures will bear the same reference numerals followed by an "A". As shown in FIG. 4, the station equipment includes a line-extender amplifier (155), having a test jack (157) connected in the feeder line (47), a status monitor (159) connected by the lead (161) to the test jack (157) and a regulated power supply (162) supplying power to each of the line-extender amplifier (155) and the status monitor (159) through the leads (163 and 165). The status monitor (105) includes a signal light (167) mounted on the outside of the housing (95A).

Figure 5:
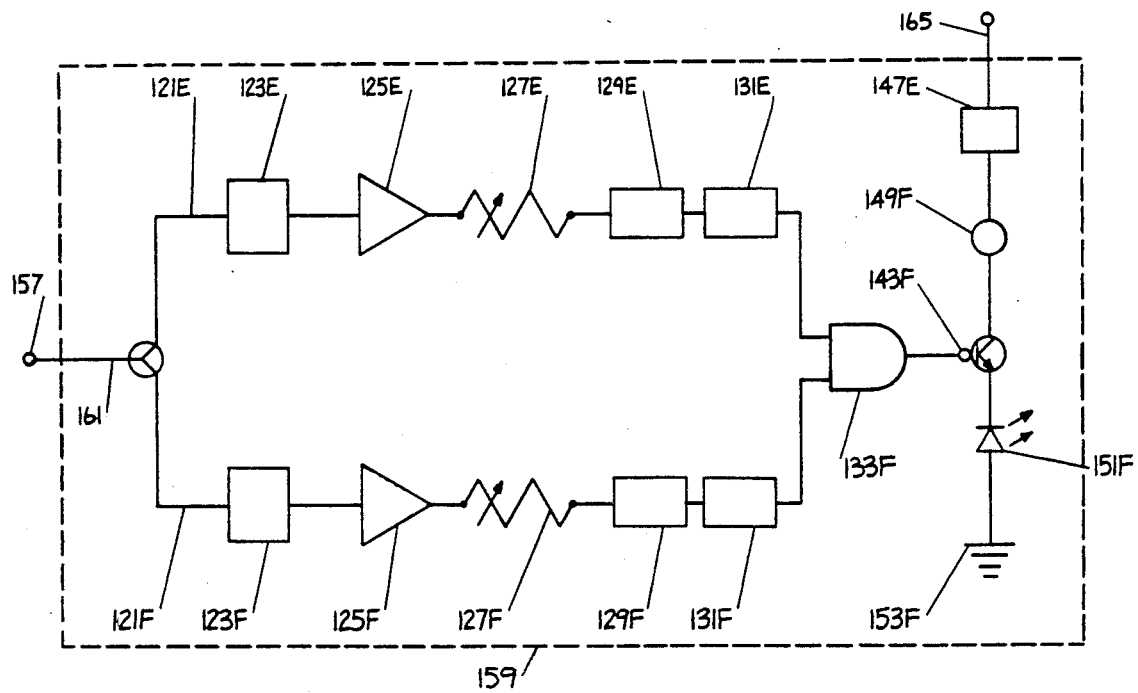
FIG. 5 is a schematic circuit diagram of the novel monitor shown in FIG. 4.

The schematic circuit for the status monitor (159) of FIG. 4 is shown in FIG. 5. The input signal along the lead (161) is passed through a fifth high pass leg (121E) a sixth low pass leg (121F) which is similar to the first and second legs (121A and 121B, respectively). The DC outputs are fed to an AND-gate (133F) and its output is fed to an electronic switch (143F) in a circuit connecting the power supply (162) through the lead (165) to a ground (153F) through a charger unit (147F), a three (3) volt battery (149F), the electronic switch (145F), a light-emitting cluster (151F), all connected in a series. When either leg (121E and 121F) produces a DC indicating that the amplifier to which it is attached is outside its prescribed operating range, either too high or too low, the switch will be on energizing the lamp (151F) to emit.

In summary, the purpose of the novel local status monitor is to provide a simplified way of monitoring cable signal distribution systems. It lets system servicing personnel keep tabs of specified operating levels by visual inspections which can be accomplished from their vehicles. This type of monitoring is best realized in outage recovery and to resolve "snowy picture" complaints more efficiently.

The novel status monitor attaches to the inside or the outside of the housing for each amplifier. In underground applications the LED cluster will be mounted to a pedestal to indicate the amplifier status. The meter will sample the "outputs" of the amplifier or module. If the amplifier/module is out-of-operating specs the monitor will then go into a warning state by activating its LEDs. This will direct system personnel right to the trouble location, eliminating the time-consuming ritual of checking two (2) or three (3) amplifier locations before the malfunctioning location is found. In the cases where a trunk and bridger amplifiers are co-located, the novel status monitor will monitor both "outputs". If either module is operating out-of-spec, the monitor will announce the condition of that particular location.

The technical scope of the novel status monitor is that it will take a reading of RF frequencies from the minus 20 dbmv test points, some manufacturers will vary from their test point values. The RF signal path will then pass through a directional coupler in which the one "side" will go through a selectable bandpass filter to monitor the high pilot carrier. The other "side" of the coupler will also pass through selectable bandpass filter to monitor the low pilot carrier. Both the high and low carrier's will be amplified and enter a AC to DC converter. At this point, the DC component will exactly mirror the "output" amplitude. The DC signal will then be compared. If the signal is too high or too low, then zero (0) volts will be sent to an AND-gate. If either side of the gate is "low", it will send a "high" signal out that in turn will activate a LED cluster. The LED cluster will receive its power from batteries that will be recharged from the CATV's own −24 vdc power supplies.

The foregoing figures and descriptions thereof are provided as illustrative of some of the preferred embodiments of the concepts of this invention. While these embodiments represent what is regarded as the best modes for practicing this invention, they are not intended as delineating the scope of the invention, which is set forth in the following claims.

What is claimed is:

1. A signal amplifier status monitor comprising:
   (a) means for detecting the variance of output signals from an amplifier beyond a prescribed range of operating parameters including means for comparing the strength of said output signals from said amplifier to a predetermined strength, said means for comparing comprising:
      an AC-to-DC converter whereby the AC output signals from said amplifier are converted to a DC signal of varying voltage, said voltage proportional to the signal strength of said AC output signals;
      means for discriminatingly passing preselected bandwidths of said output signals from said amplifier to said AC-to-DC converter;
      a voltage comparator where said voltage of said DC signal from said AC-to-DC converter is compared to a predetermined voltage level with the result that the higher of the voltages compared will be output from said voltage comparator;
   (b) means, responsive to said means for detecting, for generating a control signal in response to said variance;
   (c) means, responsive to said control signals, for alerting a locally present service person that output signals from said amplifier have varied beyond the prescribed range of operating parameters, where said means for alerting a service person are chosen from a group consisting of aurally-detectable signals and visually-detectable signals;
   (d) a switch, connecting electrical power to said means for alerting a service person, thereby activating said means for alerting a service person, said switch selectively operational in response to said control signals; and
   (e) means for variably alternating said output signals from said amplifier after said output signals from said amplifier have been discriminatingly passed through said means for discriminatingly passing preselected bandwidths of said output signals from said amplifier to said AC-to-DC converter.

2. A signal amplifier status monitor comprising:
   means for detecting the variance of output signals from an amplifier beyond a prescribed range of operating parameters comprising:
   (a) a plurality of means for comparing the strength of select bandwidths of said output signals from said amplifier to select predetermined strengths, each comprising:
      (i) an AC-to-DC converter whereby AC output signals from said amplifier are converted to a DC signal of varying voltage, said voltage proportional to the signal strength of said AC output signals;
      (ii) means for discriminatingly passing preselected bandwidths of said output signals from said amplifier to said AC-to-DC converter;
      (iii) a voltage comparator where said voltage of said DC signal from said AC-to-DC converter is compared to a predetermined voltage level with the result that the higher of the voltages compared will be output from said voltage comparator;
   (b) means, responsive to said means for detecting, for generating a control signal in response to said variance;
   (c) means, responsive to said control signals, for alerting a locally present service person that output signals from the amplifier have varied beyond the prescribed range of operating parameters, where said means for alerting a service person are chosen from a group consisting of aurally-detecting signals and visually-detectable signals;
   (d) a switch, responsive to said control signal, connecting electrical power to said means for alerting a service person thereby activating said means for alerting a service person;
   (e) means for selectively connecting said outputs from said voltage comparators to said switch whereby said switch connects electrical power to said means for alerting a service person upon the selective connection of an appropriate said output from one of said voltage comparators to said switch, said appropriate said output being an output representing said variance of output signals from said amplifier; and (f) means for variably alternating said output signals from said amplifier after said output signals from said signal amplifier have been discriminatingly passed through said means for discriminatingly passing preselected bandwidths of said output signals from said amplifier to said AC-to-DC converter.

3. A signal amplifier status monitor comprising:

means for detecting the variance of output signals from an amplifier beyond a prescribed range of operating parameters comprising:

(a) a plurality of means for comparing the strength of select bandwidths of said output signals from said amplifier to select predetermined strengths, each comprising:

(i) an AC-to-DC converter whereby AC output signals from said amplifier are converted to a DC signal of varying voltage, said voltage proportional to the signal strength of said AC output signals;

(ii) means for discriminatingly passing preselected bandwidths of said output signals from the amplifier to said AC-to-DC converter;

(iii) a voltage comparator where said voltage of said DC signal from said AC-to-DC converter is compared to a predetermined voltage level with the result that the higher of the voltages compared will be output from said voltage comparator;

(b) a switch, connecting electrical power to said means for alerting a service person thereby activating said means for alerting a service person; and (c) means for selectively connecting said outputs from said voltage comparators to said switch comprising an electronic logical "and" and an electronic "or" gate, said "and" gate connecting each of said outputs from each of said voltage comparators so that the higher of said outputs from said voltage comparators will be passed to the output of said electronic logical "or" gate, whereby said switch connects electrical power to said means for alerting a service person upon the selective connection of an appropriate said output from one of said voltage comparators to said switch, said appropriate said output being an output representing said variance of output signals from said amplifier;

means, responsive to said means for detecting, for generating a control signal in response to said variance; and, means, responsive to said control signals, for alerting a locally present service person that output signals from said amplifier have varied beyond the prescribed range of operating parameters, where said means for alerting a service person are chosen from a group consisting of aurally-detecting signals and visually-detectable signals.

4. A signal amplifier status monitor comprising:

(a) means for detecting the variance of output signals from an amplifier beyond a prescribed range of operating parameters comprising at least one means for comparing the strength of selected bandwidths of said output signals from said amplifier to select predetermined strengths, each comprising:

means, electrically connected to said output of said amplifier, for discriminatingly passing preselected bandwidths of said output signals from said amplifier;

means for amplifying said output signals from said amplifier;

means for variably attenuating said output signals from said amplifier;

an AC-to-DC converter wherein AC output signals from said amplifier are converted to a DC signal of varying voltage, said voltage proportional to the signal strength of said AC output signals; and a voltage comparator where said voltage of said DC signal from said AC-to-DC converter is compared to a predetermined voltage level with the result that the higher of the voltages compared will be output from said voltage comparator;

wherein said means for discriminatingly passing preselected bandwidths, said means for amplifying said output signals, said means for variably attenuating said output signals, said AC-to-DC converter, and said voltage comparator are connected in series;

(b) means, responsive to said means for detecting, for generating a control signal in response to said variance; and, (c) means, responsive to said control signals, for alerting a locally present service person that output signals from said amplifier have varied beyond the prescribed range of operating parameters, where said means for alerting a service person are chosen from a group consisting of aurally-detecting signals and visually-detectable signals.

* * * * *